Aug. 19, 1941.    J. F. BYERS    2,252,756
APPARATUS FOR GLASS MANUFACTURE
Filed July 16, 1937    4 Sheets-Sheet 1

Inventor
JOHN F. BYERS.
By Frank Fraser
Attorney

Aug. 19, 1941.  J. F. BYERS  2,252,756
APPARATUS FOR GLASS MANUFACTURE
Filed July 16, 1937  4 Sheets-Sheet 2

Inventor
JOHN F. BYERS.
By Frank Fraser
Attorney

Aug. 19, 1941.        J. F. BYERS        2,252,756
APPARATUS FOR GLASS MANUFACTURE
Filed July 16, 1937        4 Sheets-Sheet 3

Inventor
JOHN F. BYERS.
By Frank Fraser
Attorney

Aug. 19, 1941.　　　　J. F. BYERS　　　　2,252,756
APPARATUS FOR GLASS MANUFACTURE
Filed July 16, 1937　　　4 Sheets-Sheet 4

Inventor
JOHN F. BYERS.

By Frank Fraser
Attorney

Patented Aug. 19, 1941

2,252,756

UNITED STATES PATENT OFFICE 2,252,756

APPARATUS FOR GLASS MANUFACTURE

John F. Byers, Charleston, W. Va., assignor to Libbey-Owens-Ford Glass Company, Toledo, Ohio, a corporation of Ohio Application July 16, 1937, Serial No. 153,987

5 Claims. (Cl. 49—54)

The present invention relates to apparatus for glass manufacture and more particularly to improved heating means therefor.

The heating means of this invention may be utilized either in the melting of raw glass batch ingredients to produce molten glass or for conditioning a body of molten glass from which a glass sheet is being formed.

An important object of the invention is the provision of improved heating means which can be closely controlled to maintain the body of molten glass from which the sheet is being formed at a predetermined, constant, uniform temperature.

Another important object of the invention is the provision of improved heating means which may be employed to effect the melting of raw glass batch ingredients in a continuous manner as they are being fed to the furnace, with the result that the molten glass can be rapidly and efficiently produced.

Other objects and advantages of the invention will become more apparent during the course of the following description, when taken in connection with the accompanying drawings.

Figure 1:
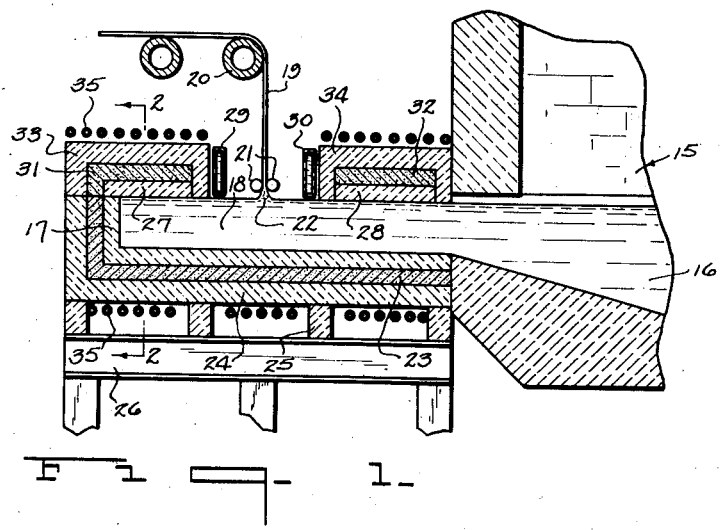
Figure 2:
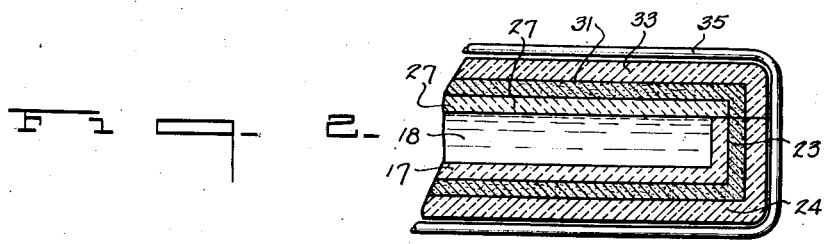
Figure 3:
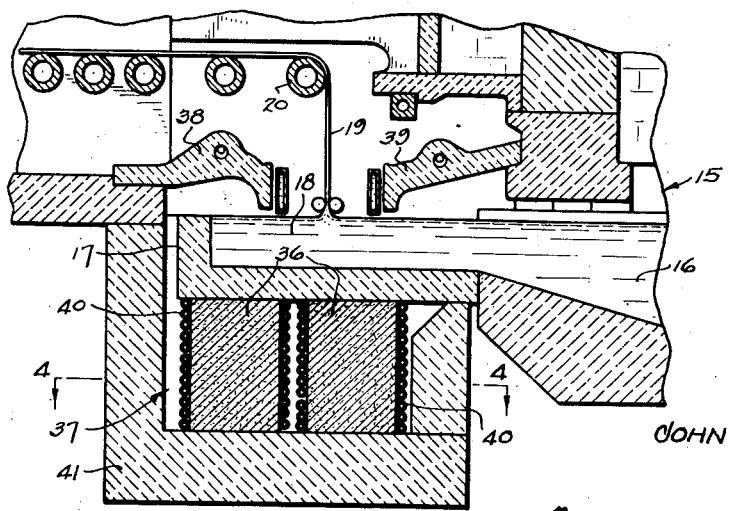
Figure 4:
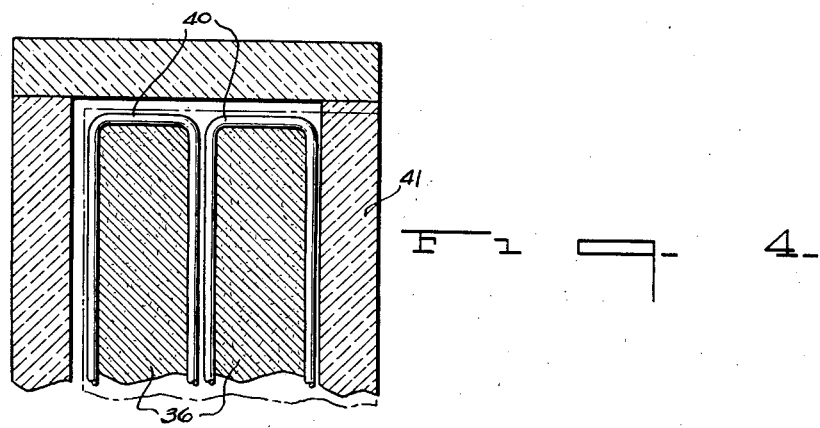
Figure 5:
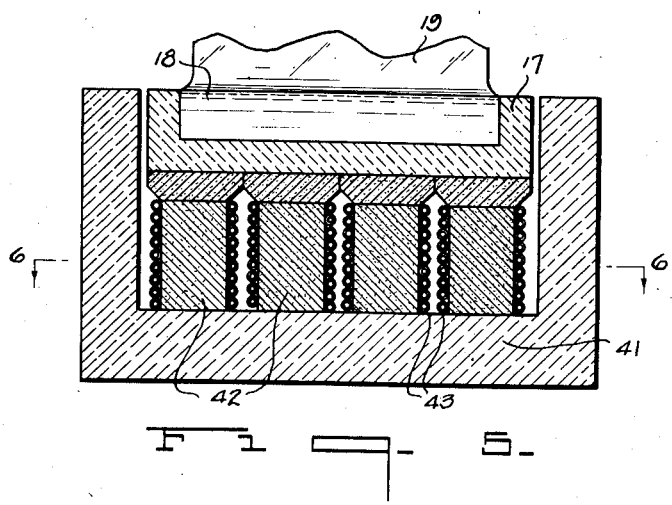
Figure 6:
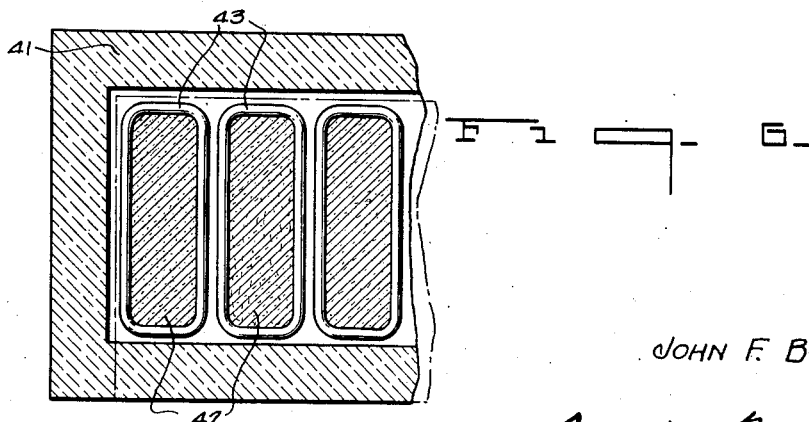
Figure 7:
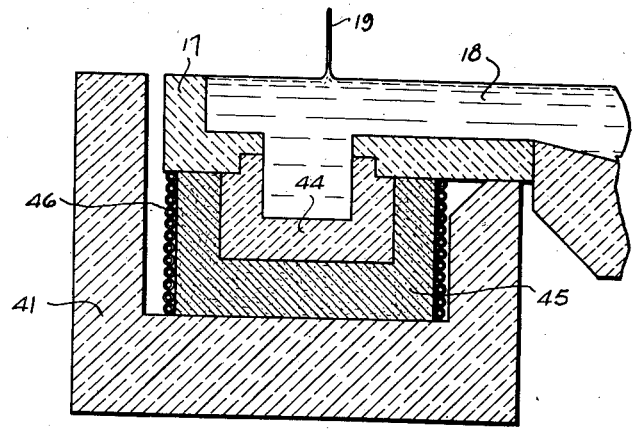
Figure 8:
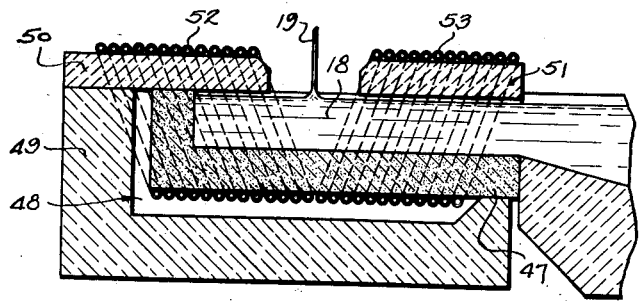
Figure 9:
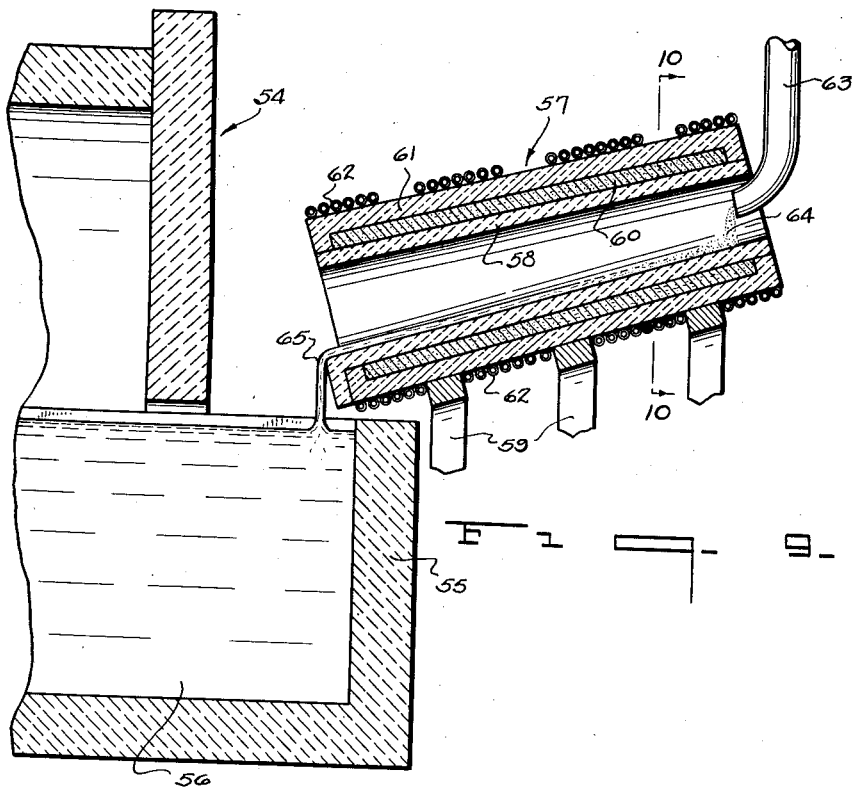
Figure 10:
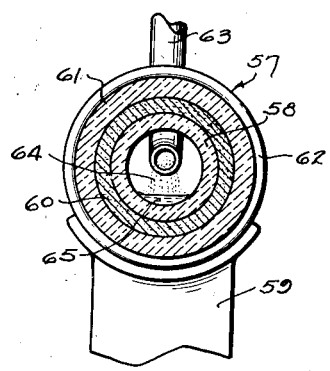

In the drawings, wherein like numerals are employed to designate like parts throughout the same, Fig. 1 is a vertical longitudinal sectional view through one form of sheet glass drawing apparatus, having associated therewith heating means embodying the present invention, Fig. 2 is a vertical sectional view taken substantially on line 2—2 of Fig. 1, Fig. 3 is a view substantially similar to Fig. 1, but showing an alternate heating arrangement, Fig. 4 is a horizontal sectional view taken substantially on line 4—4 of Fig. 3, Fig. 5 is a sectional view of still another heating arrangement, Fig. 6 is a horizontal sectional view taken substantially on line 6—6 of Fig. 5, Figs. 7 and 8 are sectional views showing still further heating arrangements, Fig. 9 is a vertical longitudinal sectional view through an apparatus for effecting the continuous melting of raw glass batch ingredients and embodying heating means provided by the present invention, and Fig. 10 is a vertical sectional view, taken substantially on line 10—10 of Fig. 9.

With reference first to Figures 1 and 2 of the drawings, 15 designates the outlet end of a tank furnace in which is produced a mass of molten glass 16. The molten glass flows from the furnace into a relatively shallow working receptacle 17, preferably of refractory clay, wherein it forms a relatively shallow body of glass 18. The glass sheet 19 is drawn upwardly from the surface of the body of molten glass 18 and while still in a semi-plastic condition, although substantially set in its final sheet form, is deflected about a bending roll 20 and carried horizontally into and through an annealing leer. The glass sheet may be held to width by knurled rollers 21 engaging opposite sides of the sheet at each edge thereof, said rollers being disposed closely adjacent the base or meniscus 22 of the sheet. This method of producing sheet glass is well known in the art as the Colburn process and is more fully disclosed in Patent 1,248,809, issued December 4, 1917. However, it is to be understood that the present invention is not limited to any particular process of forming the glass sheet.

For the purpose of facilitating the formation of a glass sheet of substantially flat, uniform thickness, it is highly desirable that the body of molten glass 18 in the receptacle 17 be maintained at as nearly a predetermined constant temperature as possible in order to effect the proper conditioning of the glass as well as hold it at the desired temperature for drawing. This is herein accomplished by the provision of novel and improved heating means associated with the receptacle 17.

In carrying out the invention, there is arranged outwardly of the receptacle 17 a layer of refractory and electrically conducting material 23 preferably consisting of carbon or graphite. This electric-conducting material is arranged opposite the bottom, sides and outer end wall of the receptacle and is covered by a layer of suitable electric-insulating material 24. The receptacle 17 is supported upon blocks 25 also preferably of electric-insulating material and which are mounted upon metal supporting beams 16.

Arranged above the body of molten glass 18 at opposite sides of the sheet 19 are the horizontal cover plates or tiles 27 and 28, inwardly of which may be located, if desired, the conventional sheet coolers 29 and 30 respectively. The cover tiles 27 and 28, which are also preferably of refractory clay, are disposed at substantially the surface of the body of molten glass 18 and arranged thereabove are layers 31 and 32 of a refractory and electrically conducting material, such as carbon or graphite. These layers of electric-conducting material are in turn covered by suitable electric-insulating material 33 and 34 respectively.

According to the invention, the receptacle 17 is adapted to be heated by high frequency induction wherein the graphite or carbon 23 surrounding said receptacle is isolated from direct contact with the primary current and given a high temperature by the heat developed in its own mass by the field of high frequency. To this end, there is provided a helically wound inductor coil 35 traversed by currents of high frequency, and preferably tubular to permit the passage of cooling fluid therethrough. The inductor coil is preferably of copper or aluminum and is wound transversely around the receptacle 17 and cover tiles 27 and 28, with the coils being placed relatively close to one another.

In operation, the high frequency current, which is produced by any known means, circulating in the inductor coil induces in the mass of carbon or graphite currents of a very great intensity which rapidly raise the temperature of said mass. In other words, eddy currents of high density are induced in the carbon or graphite mass causing it to become heated and the heat so generated is transferred by thermal conduction to the body of molten glass 18. Suitable electrical apparatus, not shown, is provided to connect the inductor coil with a source of commercial-frequency alternating current to effect the energization thereof. The connections for conducting the cooling fluid into and away from the coil have also not been shown.

With this type of heating means, the desired temperature of the body of molten glass 18 in receptacle 17 can be closely controlled so that it is possible to maintain a more even and uniform temperature in said body of glass thereby facilitating the conditioning of the glass as well as holding it at the proper temperature for drawing.

In the arrangement shown in Figs. 3 and 4, the receptacle 17 is mounted upon a plurality of supporting blocks or stools 36 arranged within a heating chamber 37, while the cover tiles 27 and 28 are omitted and employed in lieu thereof are the conventional lip-tiles 38 and 39. The glass sheet 19, however, is produced in the same manner as illustrated in Fig. 1. In the arrangement of Figs. 3 and 4, the receptacle 17 is also preferably formed of refractory clay, while the supporting blocks 36 are of carbon, graphite or other refractory and electrically conducting material. Encircling each of the supporting blocks 36 is an inductor coil 40 similar to the inductor coil 35 in Fig. 1 and operating in the same manner to effect the heating of the body of molten glass 18. In other words, the high frequency current circulating in the coils 40 will induce in the graphite or carbon supporting blocks 36 currents of a very great intensity which cause the generation of heat in the mass of carbon or graphite and which will be transferred to the molten glass by thermal conduction. The walls 41 of the heating chamber 37, in which the supporting blocks 36 are arranged, are preferably of a suitable electric-insulating material.

The arrangement in Figs. 5 and 6 is substantially the same as that of Figs. 3 and 4; the principal difference being that a greater number of supporting blocks or stools 42 are used and are arranged longitudinally of the receptacle 17 rather than transversely thereof. In this case, the supporting blocks 42 are also of carbon or graphite and wound around each block is an inductor coil 43 adapted to effect the heating of the mass of carbon or graphite by high frequency induction current as described above, with the heat being transferred to the molten glass by thermal conduction.

In Fig. 7, the receptacle 17 is of a somewhat different construction in that it is provided intermediate its ends with a transversely extending well 44. This well portion is surrounded at the bottom and sides thereof by carbon or graphite 45 about which is wound a high frequency inductor coil 46, operating in the same manner as described above to effect the heating of the molten glass.

In Fig. 8, the receptacle 47 is, itself, made of carbon, graphite, or other refractory and electrically conducting material and is arranged in a heating chamber 48, the walls 49 of which are preferably of an electric-insulating material. Mounted above the receptacle at opposite sides of the sheet 19 are cover tiles 50 and 51, wound transversely around the receptacle 47 and cover tile 50 is an inductor coil 52, while a similar inductor coil 53 surrounds the receptacle and cover tile 51. These coils may be arranged as indicated by the broken lines, so that they cover substantially the entire bottom surface of the receptacle.

As shown in Figs. 9 and 10, the same principle of high frequency induction heating may be utilized for effecting the continuous melting of raw glass batch ingredients as they are being fed to the furnace. The furnace is designated in its entirety by the numeral 54 and is provided at the receiving end thereof with the conventional dog house 55, said furnace containing a mass of molten glass 56 which is adapted to be refined and conditioned therein as well understood in the art. Arranged above the dog house 55 is the batch receiving and melting apparatus designated in its entirety by the numeral 57 and including a tubular receptacle 58, preferably of refractory clay, inclining downwardly toward said dog house and carried by supports 59. Surrounding the receptacle 58 is a layer 60 of carbon, graphite, or other refractory and electrically conducting material which is covered by a layer 61 of suitable electric-insulating material. Wound around the receptacle 58 is one or more high frequency inductor coils 62 which function to generate heat in the mass of carbon or graphite 60 as explained above to effect the heating of the contents of said receptacle. The raw glass batch ingredients are adapted to be fed into the upper outer end of the receptacle through a pipe or the like 63 as indicated at 64 and as the raw ingredients pass downwardly through the receptacle, they are gradually melted to form molten glass which flows from the lower end of the receptacle into the dog house as indicated at 65.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for glass manufacture, a refractory clay receptacle containing a body of molten glass, means for drawing a sheet upwardly therefrom, refractory clay cover tiles arranged above the body of molten glass at opposite sides of the sheet being drawn, refractory and electrically conducting material arranged outwardly of and covering said receptacle and cover tiles, electric-insulating material arranged outwardly of and covering said refractory and electrically conducting material, and electrical high frequency induction means comprising an inductor coil arranged outwardly of the electric-insulating material and encircling said receptacle and cover tiles for causing the generation of heat in said refractory and electrically conducting material which is transferred by thermal conduction through the walls of said receptacle and cover tiles to the body of molten glass.

2. In apparatus for glass manufacture, a receptacle containing a body of molten glass, means for forming a sheet therefrom, means formed of electric-conducting material for supporting said receptacle, and electrical high frequency induction means associated with said supporting means for causing the generation of heat therein which is transferred by thermal conduction through the walls of said receptacle to the body of molten glass.

3. In apparatus for glass manufacture, a refractory clay receptacle containing a body of molten glass, means for forming a sheet therefrom, means formed of refractory and electrically conducting material for supporting said receptacle, and electrical high frequency induction means comprising an inductor coil wound around said supporting means for causing the generation of heat therein which is transferred by thermal conduction through the walls of said receptacle to the body of molten glass.

4. In apparatus for glass manufacture, a refractory clay receptacle containing a body of molten glass, means for forming a sheet therefrom, a plurality of supports for said receptacle formed of refractory and electrically conducting material, electrical high frequency induction means comprising inductor coils wound around said supports for causing the generation of heat therein which is transferred by thermal conduction through the walls of said receptacle to the body of molten glass, and a chamber having walls of electric insulating material enclosing said supports.

5. In apparatus for glass manufacture, a receptacle containing a body of molten glass and having a refractory clay bottom wall, means formed of electric-conducting material for supporting said receptacle, and electrical high frequency induction means associated with said supporting means for causing the generation of heat therein which is transferred by thermal conduction through the bottom wall of said receptacle to the body of molten glass.

JOHN F. BYERS.